Feb. 3, 1970  R. ADLER  3,493,759
ACOUSTIC BEAM STEERING WITH ECHELON TRANSDUCER ARRAY
Filed Dec. 9, 1966  2 Sheets-Sheet 1

Inventor
Robert Adler

By [signature]
Attorney

Inventor
Robert Adler
By ⟨signature⟩
Attorney

United States Patent Office 3,493,759
Patented Feb. 3, 1970

3,493,759
ACOUSTIC BEAM STEERING WITH ECHELON TRANSDUCER ARRAY
Robert Adler, Northfield, Ill., assignor to Zenith Radio Corporation, Chicago, Ill., a corporation of Delaware
Filed Dec. 9, 1966, Ser. No. 600,500
Int. Cl. H04b 9/00; G02f 1/28
U.S. Cl. 250—199                    16 Claims

ABSTRACT OF THE DISCLOSURE

Sound waves are propagated across the path of a beam of monochromatic light. The sound waves are characterized by interaction wavefronts each composed of a succession of laterally adjacent finite plane wavefronts all propagating in substantially the same direction. The finite plane wavefronts are launched by a generator from respective laterally adjacent sources spaced one from the next in the direction of sound propagation by a distance effectively equal to one-half the wavelength of the sound at a given frequency.

---

The disclosed apparatus pertains to signal translating systems. More particularly, it relates to systems in which light and sound are caused to intersectingly interact at a desired angular relationship. As used herein, the terms light and sound are most general, the term light referring to both visible and invisible electromagnetic radiation and the term sound including both audible and super-audible acoustic wave energy.

As discussed in application Ser. No. 476,873, filed Aug. 3, 1965 by Robert Adler, now patent 3,373,380 issued Mar. 12, 1968 assigned to the same assignee as this application, a spatially-coherent substantially-monochromatic light beam incident upon a sound wave at a particular angle in accordance with the Bragg relationship, which depends upon the wavelengths of the light and sound, is diffracted by the sound wave at that same angle. That is, when light and sound interact at the Bragg angle, the traveling sound waves act as if they were moving mirrors. With planar sound and light wavefronts, usable Bragg angle diffraction is obtainable only over a limited angle of sound frequencies without readjustment of the angle between the wavefronts. Certain previous systems seek to overcome this limitation by embodying means for physically changing the relative orientation of the elements with change in sound frequency. The aforesaid Adler application describes the use of curved wavefronts to maintain a portion of a sound wavefront incident to a light wavefront in accordance with the Bragg angle over a wide range of sound frequencies. However, since the light and sound only interact along a small portion of the curved wavefront, much of the power in the curved wavefront is wasted.

An improvement in efficiency with such Bragg-angle interaction is obtained in accordance with the teachings in the copending application of Adrianus Korpel, Ser. No. 517,630, filed Dec. 30, 1965, now Patent No. 3,424,906, issued Jan. 28, 1969 and assigned to the same assignee as the present application. In the Korpel apparatus, corrugated sound wavefronts, each composed of a plurality of finite plane wavefronts, are directed across a beam of monochromatic light. At least a pair of the plane wavefronts have respectively different phase. With this approach, intensity maxima of the sound occur in two directions. One of these intensity maxima is utilized and its direction of propagation changes with sound frequency in a substantially compensatory manner so that the Bragg relationship is maintained as the sound frequency is varied through a finite frequency range. While the Korpel system is substantially more efficient than the system of the aforesaid Adler application, the sound intensity maxima propagating in the other of the two directions is not utilized and, therefore, represents a loss in efficiency. Also, under certain conditions a portion of the diffracted light is undesirably re-diffracted by the sound waves propagating in the other direction.

It is, accordingly, a general object of the present invention to provide light-sound-interaction signal-translating apparatus which maintains an appropriate interaction angle over a substantial range of sound frequencies while improving the efficiency of utilization of the sound energy.

It is a more specific object of the present invention to provide new and improved apparatus in which the direction of sound propagation changes in correspondence with changes in the sound frequency so as to substantially maintain Bragg-angle diffraction of the light by the sound.

Another object of the present invention is to achieve the foregoing while obtaining improved coupling between the sound signals and the sound waves which interact with the light.

A further object of the present invention is to achieve the foregoing with apparatus which features simplicity of construction and operational requirements.

Signal translating apparatus in accordance with the present invention includes means for producing a beam of substantially monochromatic light. Sound waves are directed across the path of the beam at a predetermined inclination thereto and are characterized by interaction wavefronts each composed of a succession of laterally adjacent finite plane wavefronts propagating in a predetermined common direction. The system also includes means for launching the finite plane wavefronts from an echelon array of respective laterally adjacent sources step spaced in the direction of sound propagation one from the next by a distance effectively equal to one-half the wavelength of the sound at a predetermined frequency.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

Figure 1:
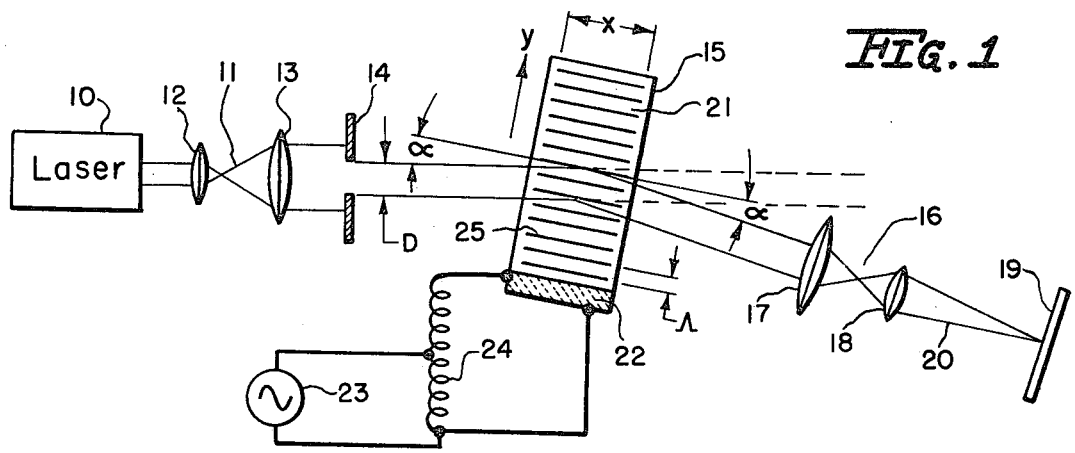
FIGURE 1 is a partly schematic diagram of a now known light-sound signal translating apparatus.

The system of FIGURE 1 is first described in order to facilitate an understanding of the operation of the overall system. This system includes a light source 10, such as a laser productive of spatially-coherent substantially-monochromatic light, magnifying telescope 11 having an eyepiece 12 and an object lens 13, a beam-limiting aperture plate 14 defining an aperture width D, a light-sound interaction cell 15, a reverse telescope 16 having an object lens 17 and an eye piece 18 and a light-responsive screen 19 across which a light beam 20 is scanned. Cell 15 is a container the walls of which are transmissive to the light waves and which in this instance is filled with water that serves as a propagating medium 21. At one end of cell 15, coupled to the water, is a transducer 22 driven by electrical signals from a signal generator or source 23 suitably matched to transducer 22 by a transformer 24. Transducer 22 develops a succession of finite plane wavefronts in water 15.

As used herein, a "finite plane wavefront" defines a plane surface of finite width along which every element has the same phase. An "interaction wavefront" is a sound wavefront which intersects the light entering through aperture 14 and interacts with that light to diffract a portion thereof at an angle to the incoming light. In FIGURE 1, the finite plane wavefronts developed in succession by transducer 22 are the interacting wavefronts.

Operationally, signal source 23 impresses signals on transducer 22 which in turn launches sound waves 25 of wavelength $\Lambda$ and width $x$ into the water. The direction $y$ of sound propagation is selected relative to the direction of incoming light propagation to achieve that which is known as Bragg diffraction. When the wavefront width $x$ is greater than the value of $\Lambda^2/\lambda$, where $\lambda$ is the wavelength of the light in medium 21, the incident light is diffracted into a single first order. This only occurs to a significant degree when the directions of incident and diffracted light are at least approximately symmetrical with respect to the acoustic or sound wavefronts. By definition, for the condition of Bragg diffraction the angle between the diffracted and undiffracted light beams is equal to $2\alpha$ where $\alpha$ is the Bragg angle determined in accordance with a relationship:

$$\sin \alpha = \lambda/2\Lambda \qquad (1)$$

The sound waves propagating in medium 21 cause a traveling-wave-type density fluctuation in the water which acts upon the light as a three-dimensional moving phase grating. With Bragg diffraction, the incident and exit angles are the same.

Cell 15 is bounded by flat, parallel faces through which the light enters and leaves. Since the cell as embodied here is disposed in air, the relation between the Bragg angle $\alpha'$ in air and the angle $\alpha$ in medium 21 is determined by Snell's law:

$$\sin \alpha'/\sin \alpha = n = \lambda'/\lambda \qquad (2)$$

where $n$ is the index of refraction of medium 21 and $\lambda'$ is the light wavelength in air. Consequently, the externally observed Bragg angle is expressed:

$$\sin \alpha' = \lambda'/2\Lambda \qquad (3)$$

As defined herein, optical wavelengths and angles measured in air are designated by primed symbols.

From Equation 3, the angle as measured in air between the undiffracted and diffracted light beams is $2\alpha'$. Since the latter value depends upon the value of $1/\Lambda$ and hence on the acoustic frequency $f$, it is possible to vary the directions of the diffracted light by changing the acoustic frequency and this is what occurs in the system of FIGURE 1. As the frequency of the signal from source 23 is changed throughout a finite range, beam 20 is scanned across screen 19 from one side to the other. The system of FIGURE 1 and various improvements therein are described in my copending application Ser. No. 388,589, filed Aug. 10, 1964, now Patent No. 3,431,504 with further improvements and modifications thereof being described and claimed in my applications Ser. Nos. 476,797, now Patent No. 3,430,115 and 476,798, filed Aug. 3, 1965, all of these applications being assigned to the same assignee as the present application.

Because of the use of telescope 16 to magnify the actual scan angle, the needed change $\alpha_d$ of the diffraction angle $\alpha$ is very small and, moreover, in the embodiment described the diffraction angle $\alpha$ is less than 1 degree. Since for that small an angle the value of $\sin \alpha$ approximates $\alpha$, for practical purposes Equation 1 may be rewritten:

$$\alpha = \lambda/2\Lambda \qquad (4)$$

Where a sound wave of wavelength $\Lambda_0$ and a frequency $f_0$ travels upward in cell 15 at a sound velocity $V$, the sound waves diffract the exiting light into a new direction separated from the original direction of light propagation by an angle $$2\alpha_0 = \lambda/\Lambda_0 = f_0\lambda/V \qquad (5)$$

For convenience, the exit angle for sound waves of frequency $f_0$ is defined as the angle of diffraction as the center sound frequency of the range of frequencies over which the sound is changed and corresponds to a nominal or center position of the beam exiting from cell 15. For a change of frequency by an amount $\Delta f$, the exiting beam angle is changed by the amount $$\alpha_d = \lambda\Delta f/V \qquad (6)$$

For a given maximum value of $\Delta f$ dependent upon the operation of transducer 22, there is a resulting maximum deflection angle $\alpha_T$. The diffracted beam has the same shape as the original beam and in the illustrated case also has uniform power density over its cross section corresponding to the aperture width D. Assuming spatial coherence across the aperture, the beam is spread only by diffraction, with the first nulls of the far-field pattern separated from the central maximum by angles of $\pm\lambda/D$. Following conventional notation in defining the value $\lambda/D$ as the smallest resolvable angle $\alpha_{min}$, the resolution N is expressed $$N = \alpha_T/\alpha_{min} = D\Delta f/V = \tau\Delta f \qquad (7)$$

where $\tau$ is the transit time of the sound wave across the aperture width D. It may be noted also that the value $\tau f_0$ represents the number of sound waves present within the aperture at an instant when the sound frequency $f = f_0$; the quantity $\tau\Delta f$ in Equation 7 is the number of waves added when the acoustic frequency is changed from its minimum to its maximum value. Correspondingly, the externally measured maximum deflection angle becomes $\alpha'_T = \lambda'\Delta f/V$ and th smallest resolvable angle $\alpha'_{min} = \lambda'/D$. The resolution N remains the same.

Where it is desired to deflect light beam 20 randomly with respect to time, as when providing access to elements of a computer memory, the maximum permissible acoustic transit time $\tau$ is limited because the appropriate acoustic frequency must be applied in order to steer the beam in a specific direction and the waves of that frequency then remain within the aperture width D for the time $\tau$. The transit time $\tau$, therefore, in such a system should not be made longer than the time interval within which it is necessary to switch the beam from one position to the next. This limitation is relaxed significantly in apparatus utilizing a linear scan as in the case of deflection in a television system. In that case, the deflection angle $\alpha'_d$ is changed at a constant rate $$\alpha/dt(\alpha'_d) = \alpha'_T T \qquad (8)$$

where T in this example is the horizontal trace time. The deflection angle as a function of time $t$ and distance $y$ is therefore expressed:

$$\alpha'_d(t,y) \cdot \alpha'_T/T \quad (t-y/V) \qquad (9)$$

The distribution of deflection angles at any given instant is characterized by a gradient $$d/dy (\alpha'_d) = -\alpha'_T/VT \qquad (10)$$

which is independent of time $t$ and of position along direction $y$. Thus, the deflection angle changes at a uniform rate along the $y$ axis, and the deflected light rays come to a focus at a constant distance $VT/\alpha'_T$. Consequently, the linear frequency-modulated sound wave acts like a cylinder lens of fixed focal length and this effect may be compensated by incorporating an additional conventional cylinder lens as described and claimed in the aforesaid application Ser. No. 476,797.

Since then, the transit time $\tau$ may have substantial magnitude, an exemplary system is able to have an aperture width D of 19 millimeters which in water having a sound velocity V of 1500 meters per second results in a transit time of 12.5 microseconds. This conveniently is approximately equal to the horizontal retrace blanking interval of present-day television standards. The acoustic frequency is modulated with a sawtooth function having negligible fly-back time. The steep transient separating the end of one sawtooth from the beginning of the next travels across the entire aperture width D during the conventional television system blanking interval.

In addition to the optical aperture width D, it is also important to consider the optical length $x$ across the sound beam. As previously noted, the sound beam width $x$ must be greater than $\Lambda^2/\lambda$. Also to be considered are the acoustic power required to deflect all incoming light and the tolerance of the angle under which the light enters. Considering first the acoustic power requirements, a plane wave of sound in a transparent medium sets up the previously mentioned three-dimensional phase grating. Within the denser regions the phase of the incoming light is retarded and within the less dense regions it is advanced. The cumulative phase retardation $\Delta\phi$ in a region of maximum density is $kx\Delta n$, where $k$ is the vacuum propagation constant $(2\pi/\lambda')$ of the light and $\Delta n$ is the change in refractive index which is proportional to sound pressure. It can be shown that, to deflect all of the light, the value $\Delta\phi$ should be equal to $\pi$. The power density in the acoustic beam, on the other hand, is proportional to the quantity $(\Delta n)^2$. A sound beam of given height $h$ (the dimension perpendicular to $x$ and $y$ in FIGURE 1) therefore carries power proportional to the quantity $x(\Delta n)^2$ or to the quantity $(\Delta\phi)^2 X$. Consequently, the sound beam width $x$ should be as large as possible to save acoustic power.

Nevertheless, an upper limit for the sound beam width $x$ is established by the tolerance on the angle formed by the incident light beam and the sound wave. To obtain Bragg diffraction as noted earlier, the incident and diffracted beam should be symmetrical with respect to the acoustic wavefronts as illustrated in FIGURE 1. This condition can hold strictly for only the specific sound frequency $f_0$. Thus, when in the process of deflecting the light the direction of the exiting beam is changed by the angle $\alpha_d$, the angle of entry should be changed correspondingly by the angle $\alpha_d/2$ in order to restore symmetry. Several of the aforesaid applications are directed to the end of effectively changing the angle at which the sound wavefronts intersect the light beam automatically as the sound frequency changes. Without such correction, the angle of beam entry into cell 15 is in error by the quantity $\alpha_d/2$.

For the specific case of a plane acoustic wavefront of an amplitude which is uniform throughout width $x$, it may be shown that the useful light output goes to zero when the angle of entry is in error by the quantity $\Lambda/x$; at this null the diffracted light originating at any point within the left half of the acoustic beam is cancelled by light diffracted at a corresponding point in the right half of the beam spaced $x/2$ from the first point. Consequently, with first nulls appearing at error angles of $\pm\Lambda/x$, the quantity $\pm\Lambda/2x$ is defined at the limit of the range of angular tolerance for proper Bragg diffraction. It also can be shown that at this tolerance limit the light is attenuated by a factor of $4/\pi^2$, which is about 4 db.

Figures 2, 3:
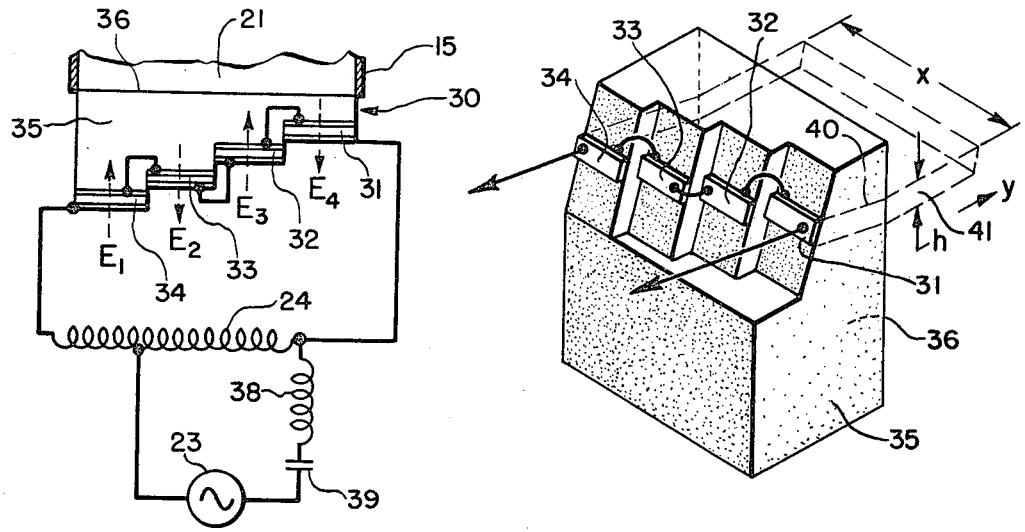
FIGURE 2 is a partly schematic fragmentary plan view of a light-sound signal translating apparatus constituting one embodiment of the present invention.
FIGURE 3 is a perspective view of a transducer assembly useful in accordance with the present invention.

From all of the foregoing, it is apparent that it is desirable to obtain substantial diffraction angles with a high degree of resolution while yet requiring only reasonable values of acoustic power and avoiding spurious diffraction effects. To the achievement of these ends, in accordance with the invention, the sound developing apparatus includes means for developing sound waves characterized by interaction wavefronts each composed of a succession of laterally adjacent finite plane wavefronts propagating in substantially the same direction with the arrangement including generating means for launching the finite plane wavefronts from respective laterally adjacent sources spaced in the direction of sound propagation, one from the next, by a distance effectively equal to one-half the wavelength of the sound at a particular frequency. In a particular embodiment, transducer assembly 30 shown somewhat schematically in FIGURE 2 and in more physical detail in FIGURE 3 constitutes an echelon array which includes a plurality of individual transducers 31, 32, 33, 34 disposed on a corresponding plurality of steps formed on an element 35 affixed at one end of cell 15 and defining an interface 36 with sound propagating medium 21. By reason of the "risers" of the steps, transducers 31–34 are laterally adjacent one to the next but each successive one of the transducers is spaced in the direction of sound propagation from the next by a distance substantially equal to one-half the wavelength of the sound at the center frequency $f_0$ within the material of which element 35 is constructed. The transducers are individually connected alternately in series opposition in a circuit completed by transformer 24. By virtue of this alternate series opposition of the transducers, adjacent ones of the transducers have mutually opposite instantaneous polarities of mechanical motion so as to produce or launch respective finite plane wavefronts of mutually opposite phase as indicated by arrows $E_1$–$E_4$.

In this instance, transformer 24 is of the auto-transformer type to match the impedance of the transducer assembly to source 23. An inductor 38 and a capacitor 39 are included in series with source 23 in order to improve the bandwidth of the coupling circuit; the transducer assembly together with the external circuitry constitutes a bandpass filter.

Each of transducers 31–34 is composed of a slab of piezoelectric material such as quartz or lead zirconate titanate sandwiched between a pair of conductive films to which the electrical connections are made. Preferably, the steps to which the respective transducers are affixed are inclined relative to interface 36 so that the sound waves emanating from the transducers propagate through element 35 along a path 40 (FIGURE 3) in a direction such as to be incident upon interface 36 at an acute angle. In this manner, sound waves reflected from the interface are scattered in substantially noninterfering directions. Beyond interface 36 in medium 21, the acoustic waves propagate through cell 15 along a path 41 with a cross section having a height $h$ very narrow compared to its width $x$.

Figure 4:
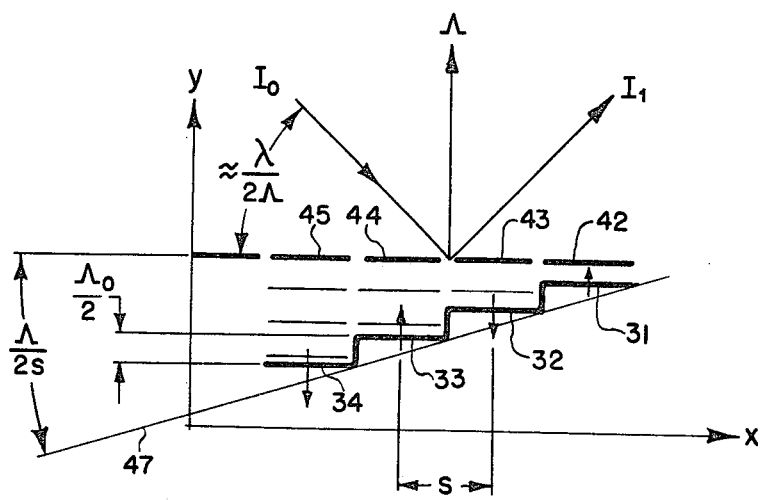
FIGURES 4 and 5 are diagrams useful in understanding the present invention.

FIGURE 4 depicts schematically the operation of the transducer assembly for the condition at which the signal from source 23 is of design center frequency $f_0$. Because of the 180° phase shift as between adjacent transducers and the individual step heights of $\Lambda_0/2$, the resulting sound wavefronts, which interact with light incoming along path $I_0$, are composed of the individual finite plane wavefronts 42–45. In this case, these individual wavefronts are aligned in a plane parallel to the $x$ direction to which the steps are parallel. Consequently, the interacting composite wavefront of the sound wave travels in the direction $y$. With the incident light beam $I_0$ forming an angle with the composite or interacting sound wavefront corresponding to the Bragg relationship, the exiting diffracted light beam $I_1$ departs at an angle to the composite wavefront also of the Bragg value. The slope of a plane 47, which grazes all of the steps, with respect to the interacting wavefront is equal to $\Lambda_0/2s$, where $s$ is the width or center-to-center spacing of the successive steps.

Figure 5:
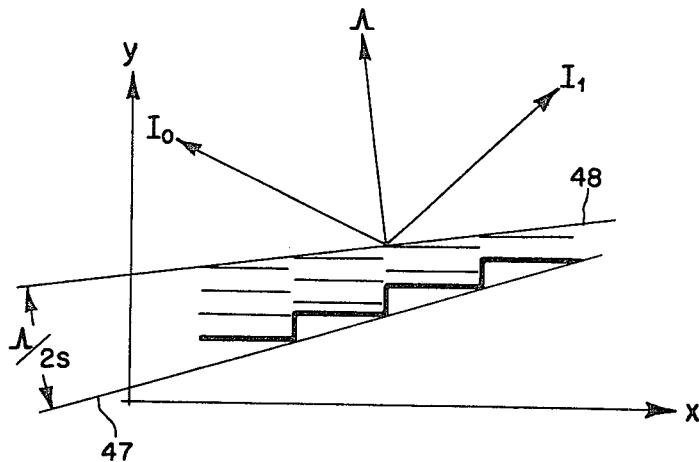

When the applied sound frequency $f$ departs from the center frequency $f_0$, the composite interacting wavefront 48 tilts in such a manner as to maintain an angle $\Lambda/2s$ with respect to plane 47. This is illustrated in FIGURE 5 wherein the direction of tilt is that which occurs for a value of sound frequency $f$ which is greater than the center frequency $f_0$. Since the individual finite wavefronts still are launched from positions spaced one-half wavelength apart in the sound propagation direction but the successive wavefronts are now closer together (of shorter wavelength), those on the left in FIGURE 5 lag in position relative to those to the right and thus cause the tilt in the composite wavefront. If the beam of light were still incoming at the original Bragg angle relative to the $x$ axis, the total angle between beam $I_0$ and plane 47 would be $$\lambda/2\Lambda_0 + \Lambda_0/2s \quad (11)$$

As the sound frequency increases, interacting wavefront 48 turns further to the left and the angle between that wavefront and the incoming light $I_0$ increases. For compensation, the increase of the angle between wavefront 48 and light beam $I_0$ may be made equal to the increment in the Bragg angle, so that $$d/d\Lambda(\lambda/2\Lambda + \Lambda/2s) = 0 \quad (12)$$

This condition is exactly met for $f_0$ when the step spacing $s$ equals $\Lambda_0^2/\lambda$ and the relationship enables substantial compensation with variations from $f_0$.

Because the Bragg angle is proportional to sound frequency while the angle of interaction wavefront 48 is inversely proportional to sound frequency, the angle which the light forms with interacting wavefront 48 is too small by the quantity $\delta^2\alpha$, where $\alpha$ is the correct Bragg angle and $\delta$ is the fractional frequency deviation $(f-f_0)/f_0$. Since this error is always in the same direction, the usable sound range can be widened by a factor of $\sqrt{2}$ by choosing a compromise position for $I_0$. The incident light beam is turned away from the acoustic wavefront by the maximum permissible error. This doubles the limit of $\delta^2$, providing two frequencies where the correction is perfect and enabling more perfect compensation in between.

Even though, as noted, the stepped array provides only a first order correction, the effect is quite striking. In one successful practical embodiment, the design center frequency $f_0$ is 28 megahertz. At this frequency, the center wavelength $\Lambda_0$ in water is 53.5 microns. Laser 10 is of the helium-neon kind producing light having a wavelength in water of 0.48 micron. The spacing $s$ between the steps is 6.0 millimeters so that with four steps the width $x$ is 24 millimeters. For the center frequency $f_0$, the Bragg angle $\alpha$ in water is 4.4 milliradians. Using a total frequency swing $\Delta f$ of 16 megahertz, or ±8 megahertz from $f_0$, the quantity $\delta = \pm 0.285$ and $\delta^2 = 0.082$. The error in alignment of acoustic wavefront 48 at the two design limit frequencies of 20 and 36 megahertz is therefore 0.36 milliradians. The tolerance range, the angle between half-power points, is about 2 milliradians.

As compared with a system in which the sound wavefronts are not caused to tilt in a compensating direction, this embodiment enables an increase in $\Delta f$ from 5 megahertz to 16 megahertz and an increase in the wavefront width $x$ from 15 millimeters to 24 millimeters, while yet enabling operation further away from the tolerance limit.

The frequency swing of 16 megahertz utilized in the illustrative actual embodiment represents 59 percent of the 27 megahertz center frequency $f_0$ (28 megahertz). This wide a frequency band gives rise to difficulties in providing efficient electro-acoustic energy conversion over that range. The fractional bandwidth over which a given transducer can operate efficiently is conventionally expressed as being equal to its electro-mechanical coupling factor. The addition of external circuit elements, as in the system of FIGURE 1, can increase the bandwidth by a factor of $\sqrt{2}$. To provide a flat response, the resulting filter, of the transducer and the circuit, should be correctly terminated at both ends. In the illustrated system, the source impedance can be easily adjusted. On the other hand, the receiving or output end is terminated by the mechanical load to which the transducer is attached and, ideally, this load should so damp the mechanical resonance of the transducer that its mechanical Q is the reciprocal of the fractional bandwidth.

The mechanical Q of a half-wave transducer made from a material of acoustic impedance $Z_t$, bounded to medium 21 of acoustic impedance $Z_m$, is $Q = \pi/2(Z_t/Z_m)$. In the illustrated case for a desired bandwidth of 59 percent, corresponding to a Q of 1.7, $Z_t$ and $Z_m$ should therefore be nearly equal. Unfortunately, the acoustic impedance of a medium 21 such as water is very low compared to that of suitable transducer materials. For example, lead zirconate-titanate transducers have sufficiently high coupling factors but they exhibit an impedance which is about twenty-two times that of water, yielding a bandwidth of only 3 percent when directly coupled to the water.

It is to the end of partially overcoming this mismatch that propagating element 35 is disposed between transducers 31-34 and water 21. In the particular exemplary embodiment, element 35 is of glass which has an acoustic impedance 2.3 times lower than the lead zirconate-titanate of the transducers. Consequently, the resulting mechanical Q is 3.7. While this provides only one-half the nominal mechanical load for the filter composed of the transducers and the circuitry, this degree of mismatch has been found to be tolerable so that it is possible to convert substantially all available electrical power within the chosen frequency range into an acoustic wave following path 40 in element 35.

With respect to the transfer of the acoustic power from element 35 into medium 21, arrangements are known which provide broad-band acoustic match between two media. A conventional approach is to use quarter-wavelength layers of intermediate impedance. In the illustrated case, the impedance ratio between glass and water is about 10, so that several layers of different impedance would be needed to maintain bandwidth by this approach. To avoid that complexity, the exemplary system accepts the 4.8 db. acoustic loss which results from the illustrated direct transmission with its 10:1 mismatch. Consequently, at the glass/water boundary, one-third of the power passes into the water while two-thirds of the power is reflected back into the glass of element 35. As noted above, however, this reflected power is rendered harmless by so shaping element 35 that the reflected power is scattered.

It can be shown that the power $P_\pi$ required for complete deflection of the light incident upon cell 15 is expressed by the relationship:

$$P_\pi = \frac{9\rho V^3 \lambda'^2 h}{2(n^3+n-2/n)^2 x} \quad (13)$$

where $\rho$ is the density of the sound propagating medium. Substituting the values of $\rho$, $V$ and $n$ for water and the vacuum wavelength of $6.33 \times 10^{-7}$ meters for $\lambda'$ yields a complete deflection power $P_\pi = 1.28 h/x$ watts. For the above-described exemplary embodiment, $x = 24$ millimeters and one transducer height $h$ is 2 millimeters. However, the diffraction spread of the sound waves over the 10 millimeter path in the glass of element 35 increases the height $h$ to about 3 millimeters between half-power points, resulting in a ratio $h/x$ of about $\frac{1}{8}$. Consequently, the acoustic power theoretically required is about 160 milliwatts.

In actual operation, it has been found that the total power requirement is about 1.1 watt. This increase in actually required power is occasioned by reason of certain losses. It appears that these include the 4.8 db. reflection loss at the glass-water interface, acoustic attenuation in the water which at the 28 megahertz frequency is about 0.13 db. per millimeter or about 1.3 db. to the midpoint of the 19 millimeter optical aperture. Losses in the bonding layer between the transducers and element 35 together with the mechanical and electrical losses in the transducers themselves and the electrical losses in the external circuit elements account for about 2 db. additional attenuation.

Figure 6:
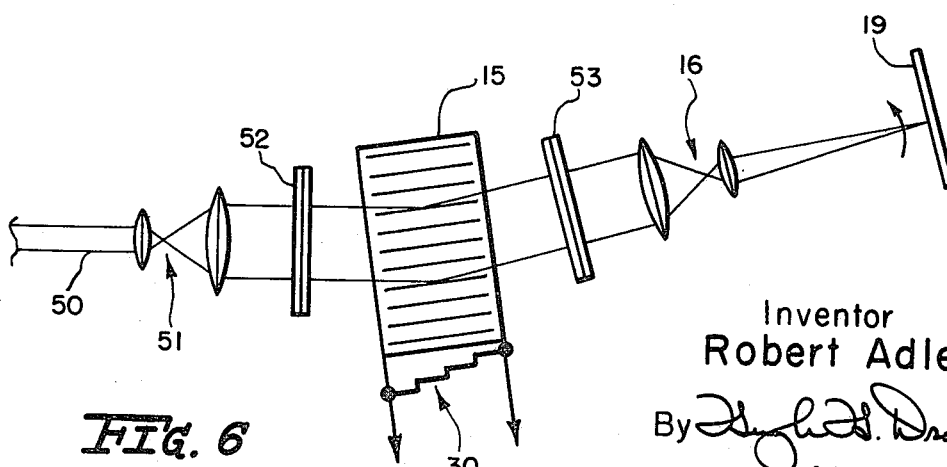
FIGURE 6 is a schematic diagram of a portion of the apparatus illustrated in FIGURE 1 modified to incorporate elements disclosed with respect to FIGURES 2–5.

The comparatively narrow rectangular cross-section of the sound beam, with height $h$ being much smaller than width $x$, contributes significantly to the conservation of acoustic power. However, the use of a sound wave height $h$ much smaller than the optical aperture width D requires that the incident light pass through a similarly narrow rectangle. To this end as shown in FIGURE 6, the light approaching cell 15 in a beam 50 is first expanded by means of a telescope 51 to a substantially larger circular cross section. The light is then passed through a convergent cylinder lens 52 to produce a wedge-shaped cross-over within cell 15 which fills the designed optical aperture width D but remains well within the aperture height $h$ of the sound beam. Beyond cell 15, a second, similar cylinder lens 53 restores the beam to its circular cross section. Also, cylinder lens 53 may be positioned along the light path to compensate for the previously mentioned cylindrical lens effect or astigmatism introduced in cell 15 by the linearly frequency-modulated acoustic wave.

In the exemplary embodiment for which dimensions are given above, telescope 51 expands the laser beam to a circular cross section of about 19 millimeters and cylinder lens 52 causes the wedge-shaped cross-over to have a width of approximately 19 millimeters with a height of substantially less than 3 millimeters.

The apparatus disclosed enables automatic redirecting of the direction of sound propagation, otherwise known as automatic beam steering, with change in sound frequency so as to obtain substantial compensation of the error from proper Bragg angle relationship resulting from the change in sound frequency. The present system is particularly advantageous because the entire sound wave is thus tilted in a compensatory manner. As disclosed, the system also includes additional features enabling improved impedance match and the attainment of a wider permissible range in sound frequency change.

While particular embodiments of the invention have been shown and described, modifications may be made, and it is intended in the appended claims to cover all such modifications as may fall within the true spirit and scope of the invention.

I claim:

1. Signal translating apparatus comprising:
   means for producing a beam of substantially monochromatic light;
   means for directing across the path of said beam at a predetermined inclination thereto sound waves characterized by interaction wavefronts each composed of a succession of laterally adjacent finite plane wavefronts all propagating in a predetermined common direction;
   and generating means included in said directing means for launching said finite plane wavefronts from an echelon array of respective laterally adjacent sources step-spaced in said common direction one from the next by a distance effectively equal to one-half the wavelength of said sound at a predetermined frequency.

2. Apparatus as defined in claim 1 in which said sound waves are of frequencies within a predetermined range of frequencies around a center value of said predetermined frequency and in which, at said center value, the angle of intersection between said interaction wavefronts and said beam at said center value is substantially equal to the Bragg angle corresponding to the wavelengths of said sound and light and, at other frequencies within said range, said interaction angle changes in a substantially compensatory manner in response to change in said sound frequency.

3. Apparatus as defined in claim 2 in which a predetermined minimum portion of said beam is diffracted by said sound waves when said angle of intersection differs from said Bragg angle by a given amount and in which, for a sound frequency of said center value, said angle of intersection differs from said Bragg angle in a direction away from said interacting wavefronts and by an amount corresponding to said given amount.

4. Apparatus as defined in claim 1 in which said sound waves are of frequencies within a predetermined range of frequencies around a center value of said predetermined frequency and in which, at said center value, the center-to-center spacing between said laterally adjacent sources is substantially equal to $\Lambda_0^2/\lambda$ where $\Lambda_0$ is the wavelength of said sound waves at said center value and $\lambda$ is the wavelength of said light.

5. Apparatus as defined in claim 1 in which adjacent ones of said sources launch respective finite plane wavefronts of mutually opposite phase.

6. Apparatus as defined in claim 1 in which said sources each include an electromechanical transducer.

7. Apparatus as defined in claim 6 in which said transducers are connected in series.

8. Apparatus as defined in claim 7 in which the instantaneous polarity of mechanical motion of successive ones of said transducers is mutually opposite.

9. Apparatus as defined in claim 1 in which said sound waves defined a cross-section with a width in the direction of said light path substantially greater than the height in the direction transverse thereto.

10. Apparatus as defined in claim 9 in which a convergent cylinder lens is disposed in the path of said beam ahead of said directing means for shaping the beam into a wedge-shaped cross-over within said direction means corresponding to said cross-section.

11. Apparatus as defined in claim 10 in which a divergent cylinder lens is disposed in the path of said beam beyond said directing means.

12. Apparatus as defined in claim 1 in which said sound waves and said light interact within a given medium and an element, having an acoustic impedance at the frequency of said sound waves intermediate that of said medium and said generating means, is disposed in the path of said sound waves between said medium and said generating means.

13. Apparatus as defined in claim 12 in which the interface between said element and said medium is inclined at an angle to the path of said sound waves in said element for scattering waves reflected from the interface.

14. Apparatus as defined in claim 1 which further includes:
   a medium in which said sound waves and said light interact;
   an element, adjacent to said medium, having an interface therewith through which said sound waves are propagated from the element to said medium with said element having an opposite surface inclined to said interface and defining a series of steps corresponding in number to the number of said finite plane wavefronts;
   and a corresponding plurality of transducers individually affixed to respective ones of said steps.

15. Apparatus as defined in claim 14 in which the risers of said steps are effectively equal to one-half the wavelength of said sound within said element at a predetermined center frequency within a range of sound frequencies.

16. Apparatus as defined in claim 15 in which the mechanical motions of adjacent ones of said transducers are of mutually opposite instantaneous polarity.

References Cited

UNITED STATES PATENTS

| 3,306,977 | 2/1967 | Brueggemann | 350—161 |
| 3,435,228 | 3/1969 | Gordon | 250—199 |
| 2,155,659 | 4/1939 | Jeffree | 350—161 |
| 3,087,148 | 4/1963 | Ludewig | 350—150 |
| 3,102,959 | 9/1963 | Diemer | 250—199 |
| 3,334,956 | 8/1967 | Staunton | 350—166 |
| 3,383,627 | 5/1968 | Desmares | 250—199 |

JOHN W. CALDWELL, Primary Examiner

ALBERT J. MAYER, Assistant Examiner

U.S. Cl. X.R.

350—161